United States Patent Office 3,819,612
Patented June 25, 1974

3,819,612
2-SUBSTITUTED ADENOSINE DERIVATIVES AND THE PRODUCTION THEREOF
Kin-ichi Imai, Toyonaka, and Mikio Honjo, Takatsuki, Japan, assignors to Takeda Chemical Industries, Ltd., Osaka, Japan
No Drawing. Filed Sept. 23, 1971, Ser. No. 183,270
Claims priority, application Japan, Sept. 25, 1970, 45/84,369
Int. Cl. C07d 51/54
U.S. Cl. 260—211.5 R          7 Claims

ABSTRACT OF THE DISCLOSURE

Novel 2-substituted adenosine derivatives having a prolonged coronary dilatory and hypotensive action are provided represented by the formula

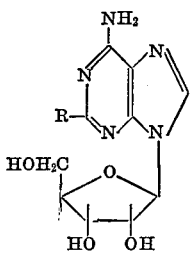

wherein R is an alkyl group of 2 to 4 carbon atoms or phenyl group having no substituent or having, at least one nitro, halogen, alkyl or alkoxy substituent. A process for the preparation of these compounds is also provided involving reacting 5-amino-1-($\beta$-D-ribofuranosyl)-4-imidazolecarbonitrile with a nitrile compound of the formula

RCN wherein R is as defined above.

---

This invention relates to new and novel 2-substituted adenosine derivatives, and to a method for the production thereof.

The new and novel 2-substituted adenosine derivatives have a prolonged coronary dilatory action and hypotensive action. Moreover, the pharmacological activity of these 2-substituted adenosine derivatives is prolonged and substantially greater as compared with adenosine per se as well as other adenosine derivatives. Additionally, the present compounds are also substantially free of side-effects.

The 2-substituted adenosine derivatives of this invention are represented by the following general formula (I):

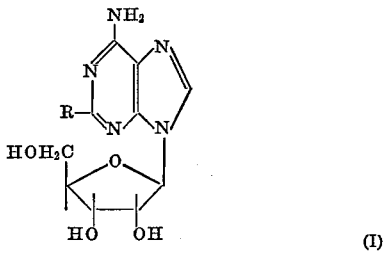

wherein R is an alkyl group having 2 to 4 carbon atoms, or phenyl group having no substituent or having one or more substituents such as a nitro, halogen, alkyl or an alkoxy group.

Referring to the formula (I), illustrative alkyl groups having 2 to 4 carbon atoms represented by R include, for example, ethyl, propyl, iso-propyl, butyl, iso-butyl, sec-butyl, tert-butyl; and the phenyl group may have one or more substituents such as a nitro, halogen (e.g. fluorine, chlorine, bromine, iodine), alkyl (e.g. methyl, ethyl, propyl, iso-propyl), or alkoxy (e.g. methoxy, ethoxy, propoxy, isopropoxy) group.

The compounds represented by the formula (I) are produced by reacting 5-amino-1-($\beta$-D-ribofuranosyl)-4-imidazolecarbonitrile with a nitrile compound represented by the general formula (II)

RCN          (II)

wherein R has the same meaning as defined above, the reaction being conducted in the presence of a base.

The nitrile compounds (II) may preferably be employed in an amount equal to at least one mole equivalent relative to 5-amino-1-($\beta$-D-ribofuranosyl)-4-imidazolecarbonitrile; suitably in an amount equal to about 1–5 mols for each mol of 5-amino-1-($\beta$-D-ribofuranosyl)-4-imidazolecarbonitrile.

Suitable bases which may be employed include ammonia, amines such as methylamine, dimethylamine; an alkali metal alcoholate such as sodium methylate, sodium ethylate, sodium methoxyethylate, potassium tertiary butylate, and the like. When the aforesaid ammonia or amines are used, the reaction is suitably carried out by use of ammonia or the amine in an amount of more than one mol equivalent relative to 5-amino-1-($\beta$-D-ribofuranosyl)-4-imidazolecarbonitrile, in the presence of a solvent such as, for example, alcohols such as methanol, ethanol and 2-methoxyethanol; dimethylformamide; or dimethylsulfoxide, at a temperature ranging from about 150°–250° C., under pressure, in a sealed vessel. The reaction is generally completed within 20 hours. Where the alcoholates are employed, the reaction is suitably carried out by employing the alcoholates in an amount of 1–5 mols relative to 5-amino-1-($\beta$-D-ribofuranosyl)-4-imidazolecarbonitrile. The reaction more advantageously proceeds in the presence of an alcohol such as methanol, ethanol, tertiary butanol or 2-methoxyethanol, under reflux, for a period of about 10 to 48 hours.

The adenosine derivatives (I) thus obtained may be easily recovered from the reaction mixture. For example, the 2-substituted adenosine derivatives (I) may be isolated and purified by condensing the reaction mixture as it is or after neutralization, and subsequently, by recrystallizing the condensate from a suitable solvent such as water.

The end product is usually obtained in the form of the free base and, if required or desired, said product may be converted into a pharmaceutically acceptable salt such as the hydrochloride, sulfate, citrate, etc., by conventional procedures.

The process of this invention advantageously produces the desired products, in high yield, by a simple procedure.

Pharmaceutical compositions containing one or more adenosine derivatives of this invention can be prepared according to per se, conventional methods. Unit dosage forms of these pharmaceutically active products can thus be prepared in the form of powder, capsules, pills, injectables, and the like.

A typical effective daily dose of the pharmaceutically active compounds of this invention, when administered orally to a human adult for the purpose of, for example, treating coronary insufficiency, is usually about 1 mg. to 500 mg., although an increased or reduced daily dose is also effective depending on the symptoms.

In the following examples, the relationship between part(s) by weight and part(s) by volume corresponds to the relationship between gram(s) and milliliter(s).

EXAMPLE 1

A mixture of 0.96 part by weight of 5-amino-1-($\beta$-D-ribofuranosyl) - 4 - imidazolecarbonitrile (hereinafter referred to as AICN-riboside), 1.2 part by weight of benzonitrile and 32 parts by volume of 20% methanolic ammonia is heated at 180° C. for 15 hours in a sealed vessel. After cooling, the reaction solution is concentrated under reduced pressure. To the residue is added 5 ml. of ethanol. The resulting crystals are collected, by filtration, and are recrystallized from water to give 0.353 part by weight of 2-phenyladenosine in the form of colorless needles melting at 228°–229° C., in a 36% yield.

*Elemental analysis.*—Calculated for $C_{16}H_{17}O_4N_5$: C, 55.97; H, 4.99; N, 20.40. Found: C, 55.63; H, 4.86; N, 20.43.

$[\alpha]_D^{28} = -0.3°$ (C.=1.0, in dimethylformamide).

Ultraviolet absorption spectrum:

$\lambda_{maximum}^{0.1\ N\text{-}HCl}$ 270 m$\mu$ ($\epsilon$ 16,200), 294 m$\mu$ (shoulder).

$\lambda_{maximum}^{H_2O}$ 238.5 m$\mu$ ($\epsilon$ 23,400), 268 m$\mu$ ($\epsilon$ 14,300).

$\lambda_{maximum}^{0.1\ N\text{-}NaOH}$ 238.5 m$\mu$ ($\epsilon$ 24,100), 268 m$\mu$ ($\epsilon$ 14,300).

EXAMPLE 2

To a solution of 1.15 part by weight of metallic sodium in 100 parts by volume of ethanol are added 2.4 parts by weight of AICN-riboside and 2.06 parts by weight of benzonitrile. The mixture is refluxed for 16 hours. After the reaction is completed, the reaction solution is poured into 100 parts by volume of water, followed by adjusting the solution to pH 6 with 1N-hydrochloric acid. The resulting solution is concentrated to 30 parts by volume under reduced pressure and is left standing in a refrigerator to give 1.03 part by weight of 2-phenyladenosine in the form of colorless crystals.

EXAMPLE 3

A mixture of 1.2 part by weight of AICN-riboside, 0.815 part by weight of 4-nitrobenzonitrile and 30 parts by volume of 20% methanolic ammonia is heated at 200° C. for 15 hours in a sealed vessel. The reaction mixture is treated in a manner similar to that described in Example 1, to give 0.745 part by weight of 2-(4-nitrophenyl)-adenosine in the form of yellow needles melting at 265° C., in a 38% yield.

*Elemental analysis.*—Calculated for $C_{16}H_{16}O_6N_6$: C, 49.50; H, 4.15; N, 21.64. Found: C, 49.65; H, 4.08; N, 21.53.

$[\alpha]_D^{19} = +7.5°$ (C.=1.0, in dimethylformamide).

Ultraviolet absorption spectrum:

$\lambda_{maximum}^{0.1\ N\text{-}HCl}$ 264 m$\mu$ ($\epsilon$ 15,500), 315 m$\mu$ ($\epsilon$ 13,200).

$\lambda_{maximum}^{H_2O}$ 217.5 m$\mu$ ($\epsilon$ 22,400), 262 m$\mu$ ($\epsilon$ 17,400), 318 m$\mu$ ($\epsilon$ 11,200).

$\lambda_{maximum}^{0.1\ N\text{-}NaOH}$ 220.5 m$\mu$ ($\epsilon$ 20,700), 263 m$\mu$ ($\epsilon$ 16,900), 320 m$\mu$ ($\epsilon$ 10,200).

EXAMPLE 4

A mixture of one part by weight of AICN-riboside, one part by weight of para-methoxy-benzonitrile and 15 parts by volume of 20% methanolic ammonia is heated at 180° C. for 16 hours in a sealed vessel. The reaction mixture is treated in a manner similar to that described in Example 1, to give 0.50 part by weight of 2-(para-methoxyphenyl)-adenosine as colorless needles melting at 250° C. in 32% yield.

*Elementary analysis.*—Calculated for $C_{17}H_{19}O_5N_5$: C, 54.68; H, 5.13; N, 18.76. Found: C, 54.48; H, 5.12; N, 1878.

Ultraviolet absorption spectrum:

$\lambda_{max.}^{H_2O}$ 253 m$\mu$, 289 m$\mu$, $\lambda_{max.}^{0.1\ N\text{-}HCl}$ 274 m$\mu$, 306 m$\mu$.

EXAMPLE 5

A mixture of one part by weight of AICN-riboside, 1.2 part by weight of 3,4,5-trimethoxy-benzonitrile and 20 parts by volume of 20% methanolic ammonia is heated at 180° C. for 20 hours in a sealed vessel. The reaction mixture is treated in a manner similar to that described in Example 1, to give 0.52 part by weight of 2-(3,4,5-trimethoxyphenyl)-adenosine as colorless needles melting at 99°–101° C. in 28% yield.

*Elemental analysis.*—Calculated for $C_{19}H_{23}N_5O_7 \cdot \frac{1}{2} H_2O$: C, 51.57; H, 5.47; N, 15.83. Found: C, 51.41; H, 5.41; N, 16.19.

Ultraviolet absorption spectrum:

$\lambda_{max}^{H_2O}$ 221 m$\mu$, 261 m$\mu$, 295 m$\mu$.

EXAMPLE 6

A mixture of 1.5 part by weight of AICN-riboside, 1.0 part by weight of ethyl nitrile and 20 parts by volume of methanolic sodium methylate is heated at 180° C. for 16 hours in a sealed vessel. The reaction mixture is treated in a manner similar to that described in Example 1, to give 0.5 part by weight of 2-ethyl-adenosine in the form of an amorphous powder, in a 26.0% yield.

*Elemental analysis.*—Calculated for $C_{12}H_{17}N_5O_4 \cdot \frac{1}{4} H_2O$: C, 48.07; H, 5.88; N, 23.36. Found: C, 48.10; H, 5.77; N, 23.31.

Ultraviolet absorption spectrum:

$\lambda_{max.}^{0.1\ N\text{-}HCl}$ 260 m$\mu$ ($\epsilon$ 14,000), $\lambda_{max.}^{H_2O}$ 264 m$\mu$ ($\epsilon$ 14,400).

$\lambda_{max.}^{0.1\ N\text{-}NaOH}$ 260 m$\mu$ ($\epsilon$ 15,300).

EXAMPLE 7

A mixture of 1.5 part by weight of AICN-riboside, 2 parts by weight of butyl nitrile and 30 parts by volume of methanolic sodium ethylate is heated at 180° C. for 16 hours in a sealed vessel. The reaction mixture is treated in a manner similar to that described in Example 1, to give 0.4 part by weight of 2-butyl-adenosine in the form of a colorless hydroscopic powder, in a 20% yield.

*Elemental analysis.*—Calculated for $C_{14}H_{21}N_5O_4 \cdot \frac{1}{2} H_2O$: C, 50.59; H, 6.67; N, 21.07. Found: C, 50.63; H, 6.34; N, 2082.

N.M.R. spectrum (in $d_6$-DMSO):

$\delta$ (p.p.m.): 1.10 (3H, t. $CH_3$—), 1.3–2.1 (4H, m, —$CH_2$—$CH_2$—), 2.8 (2H, m, —$CH_2$—), 6.0 (1H, d, H), 7.25 (2H, broad S —$NH_2$) 8.15 (1H, S, $H_8$).

EXAMPLE 8

A mixture of 1.5 part by weight of AICN-riboside, 4 part by weight of para-chloro-benzonitrile and 20 parts by volume of 20% methanolic ammonia is heated at 180° C. for 20 hours in a sealed vessel. The reaction mixture is treated in a manner similar to that described in Example 1 to give 1.8 part by weight of 2-(para-chlorophenyl)-adenosine as pale brown needles melting at 258° C. in a yield of 77%.

*Elementary analysis.*—Calculated for $C_{16}H_{16}N_5O_4Cl$: C, 50.87; H, 4.27; N, 18.54. Found: C, 50.41; H, 4.25; N, 17.92.

What is claimed is:

1. A 2-substituted adenosine derivative of the formula

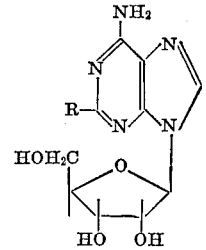

wherein R is phenyl having no substituent or having at least one substituent selected from the group consisting of nitro, halogen, alkyl having 1 to 3 carbon atoms and alkoxy having 1 to 3 carbon atoms, and a pharmaceutically acceptable salt thereof.

2. A 2-substituted adenosine derivative according to claim 1, which is 2-phenyl adenosine, and a pharmaceutically acceptable salt thereof.

3. A 2-substituted adenosine derivative according to claim 1, which is 2-paramethoxyphenyl adenosine, and a pharmaceutically acceptable salt thereof.

4. A 2-substituted adenosine derivative according to claim 1, which is 2-(4-nitrophenyl)-adenosine, and a pharmaceutically acceptable salt thereof.

5. A method for producing a 2-substituted adenosine derivative of

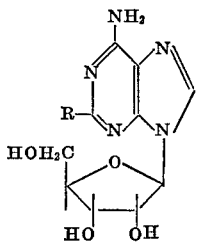

which consists of reacting 5-amino-1-(β-D-ribofuranosyl)-4-imidazolecarbonitrile with a nitrile compound represented by the formula

RCN             (II)

wherein R is an alkyl group having 2 to 4 carbon atoms, or phenyl having no substituent or having at least one substituent selected from the group consisting of nitro, halogen, alkyl having 1 to 3 carbon atoms and alkoxy having 1 to 3 carbon atoms, in the presence of a base.

6. A method according to claim 5, wherein R is phenyl having no substituent or having at least one substituent selected from the group consisting of nitro, halogen, alkyl having 1 to 3 carbon atoms and alkoxy having 1 to 3 carbon atoms.

7. A method according to claim 5, wherein the base is an alkali alcoholate or ammonia.

References Cited
UNITED STATES PATENTS

| | | | |
|---|---|---|---|
| 3,364,199 | 1/1968 | Yamazaki et al. | 260—211.5 R |
| 3,541,079 | 11/1970 | Schramm et al. | 260—211.5 R |
| 3,014,900 | 12/1961 | Schroeder | 260—211.5 R |
| 3,332,935 | 7/1967 | Yamazaki et al. | 260—211.5 R |
| 3,431,252 | 3/1969 | Walton | 260—211.5 R |
| 3,535,207 | 10/1970 | Shiro et al. | 260—211.5 R |

JOHNNIE R. BROWN, Primary Examiner

U.S. Cl. X.R.

424—180